United States Patent [19]

Terauchi

[11] Patent Number: 5,831,740
[45] Date of Patent: Nov. 3, 1998

[54] OPTICAL CHARACTERISTIC MEASURING APPARATUS WITH CORRECTION FOR DISTANCE VARIATION

[75] Inventor: Koichi Terauchi, Toyohashi, Japan

[73] Assignee: Minolta Co., Ltd., Osaka, Japan

[21] Appl. No.: 843,641

[22] Filed: Apr. 10, 1997

[30] Foreign Application Priority Data

Apr. 22, 1996 [JP] Japan .................................. 8-100254

[51] Int. Cl.⁶ .................................................. G01J 3/50
[52] U.S. Cl. .......................................... 356/402; 250/226
[58] Field of Search ................................. 356/402, 375; 250/226

[56] References Cited

U.S. PATENT DOCUMENTS

| | | | |
|---|---|---|---|
| 4,389,118 | 6/1983 | Yuasa et al. | 356/404 |
| 4,707,138 | 11/1987 | Coatney | 356/402 |
| 5,483,339 | 1/1996 | Van Aken et al. | 356/326 |
| 5,576,831 | 11/1996 | Nikoonahad et al. | 356/237 |
| 5,592,294 | 1/1997 | Ota et al. | 356/402 |

FOREIGN PATENT DOCUMENTS 1-276028  11/1989  Japan .

OTHER PUBLICATIONS

Yoshimitsu Nao (Sakata Inx Corp.), "Macbeth Remote On–Line Color Control System," *Compertech*, published Jul. 1992, pp. 28–30. (English Abstract).

*Primary Examiner*—F. L. Evans
*Attorney, Agent, or Firm*—Burns, Doane, Swecker & Mathis, LLP

[57] ABSTRACT

A spectral colorimeter includes an integrating sphere light source for projecting a beam of illuminating light to a sample, a light intensity sensor for receiving light reflected from the sample, a spectral characteristic calculator for calculating a spectral characteristic of the sample based on light reception data. The calorimeter is provided with a positional displacement detector for detecting a positional displacement of an illuminated spot of the sample and a corrector for correcting a calculated spectral characteristic based on a detected positional displacement of the illuminated spot. The spectral characteristic of the sample can accurately be obtained irrespective of a distance variation.

13 Claims, 4 Drawing Sheets

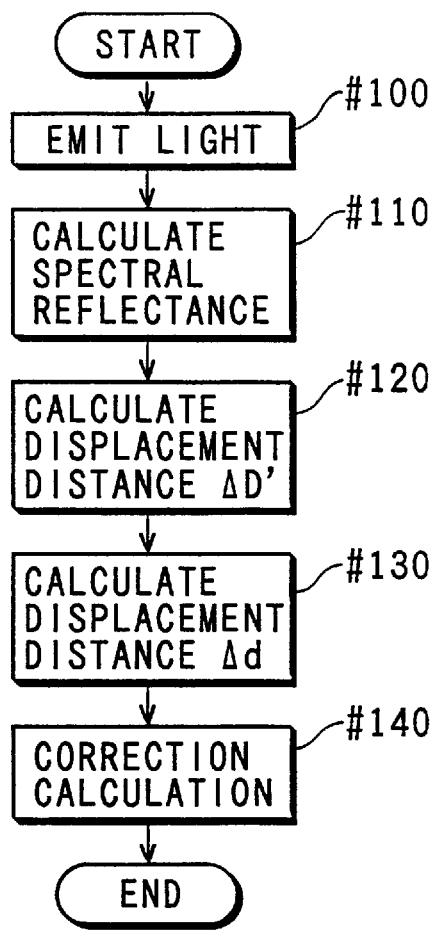

OPTICAL CHARACTERISTIC MEASURING APPARATUS WITH CORRECTION FOR DISTANCE VARIATION

BACKGROUND OF THE INVENTION

This invention relates to an optical characteristic measuring apparatus for measuring an optical characteristic of a sample without contact onto the sample, particularly to an optical characteristic measuring apparatus capable of correcting an influence caused by a distance variation from the sample.

There have been marketed an optical characteristic measuring apparatus such as a spectral colorimeter for measuring a spectral reflection characteristic or transmittance characteristic of a sample. Also, a non-contact measurement has been made to measure an optical characteristic of a surface of moving samples in a production line or the like since it is difficult to make a measurement while bringing a spectral calorimeter into contact with the samples.

However, in the case of the non-contact measurement, measurement values are subject to errors if a distance between the calorimeter and the surfaces of the samples differs due to a variation in the thickness of the samples and particularly due to the warping of the samples which are considerably seen in elongated samples. Thus, with the conventional spectral colorimeters, it is difficult to make an accurate non-contact measurement.

The errors caused by the distance variation may be reduced by conducting a measurement while arranging the spectral calorimeter in a position spaced away by a substantially long distance as compared to the varying distance, e.g. several meters from the samples. Even in this case, it is extremely difficult to completely eliminate the errors. Further, in this case, since the illuminance of the surfaces of the samples is reduced due to a long measurement distance, the light amount of a light source needs to be increased. Further, since the spectral colorimeter is arranged in a distant position, its maintenance becomes difficult.

SUMMARY OF THE INVENTION

It is an object of the present invention to provide an optical characteristic measuring apparatus which has overcome the problems residing in the prior art.

It is another object of the present invention to provide an optical characteristic measuring apparatus which can correct errors caused by a distance variation from samples.

According to an aspect of the present invention, an optical characteristic measuring apparatus comprises: an illuminator which projects a beam of illuminating light to a sample; a light receiver which receives light reflected from the sample to generate light reception data; an optical characteristic calculator which calculates an optical characteristic of the sample based on the light reception data; a position detector which detects a position of an illuminated portion of the sample; and a corrector which corrects a calculated optical characteristic based on a detected position of the illuminated portion.

With thus constructed optical characteristic measuring apparatus, an illuminated position on the sample is detected, an obtained optical characteristic of the sample is corrected based on a detected illuminated position. Accordingly, the optical characteristic of the sample can accurately be obtained irrespective of a distance variation. In other words, the optical characteristic of the sample can accurately be calculated even by the non-contact measurement.

These and other objects, features and advantages of the present invention will become more apparent upon a reading of the following detailed description and accompanying drawings.

BRIEF DESCRIPTION OF THE DRAWINGS

FIG. 5 is a flowchart showing an operation procedure.

DETAILED DESCRIPTION OF THE PREFERRED EMBODIMENTS OF THE INVENTION

Figure 1:
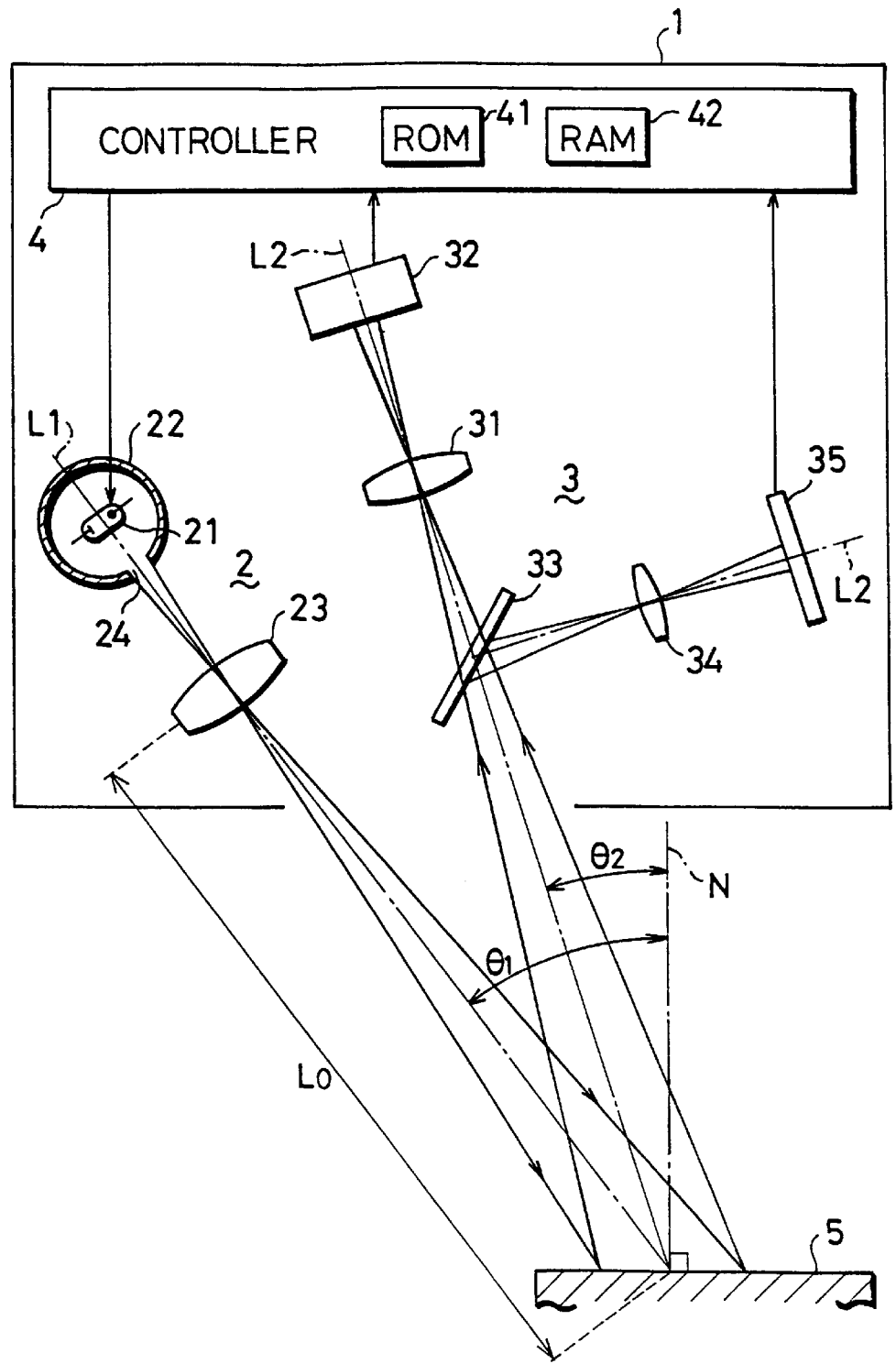
FIG. 1 is a diagram showing a construction of a spectral calorimeter as one embodiment of the present invention.

FIG. 1 is a construction diagram of a spectral colorimeter according to the present invention.

This spectral colorimeter includes an illumination optical system 2, a light sensing optical system 3 and a controller 4 inside an apparatus main body 1 and is adapted to measure the reflection characteristic of the surfaces of samples 5, e.g. conveyed by a conveyance belt in a manufacturing factory.

The illumination optical system 2 includes a light source 21, an integrating sphere 22 and a lens 23. The light source 21 is constructed by a xenon lamp or the like and is disposed substantially in the center of the integrating sphere 22. The integrating sphere 22 has a white diffuse reflection paint such as $M_gO$ or $B_aSO_4$ applied to its inner wall, and is adapted to generate a diffused light by diffusely reflecting a light emitted from the light source 21. An aperture 24 is formed in a specified position of the integrating sphere 22. An unillustrated light blocking plate is provided between the light source 21 and the aperture 24 so that a direct light of the light source 21 does not go out through the aperture 24.

The lens 23 is disposed in a position in the vicinity of the aperture 24 and, for example, on a line connecting the center of the integrating sphere 22 and the aperture 24 to form an optic axis L1. The lens 23 gathers the diffused light coming out of the aperture 24 and guides it along the optic axis L1. Thus, the light is incident on the surface of the sample 5 while forming a small diameter spot, and the surface of the sample 5 within this spot is uniformly illuminated.

The light sensing optical system 3 includes a lens 31, a spectral sensor 32, a beam splitter 33, a lens 34 and a position sensor 35. The lens 31 forms an optic axis L2 and guides the reflection light of the sample 5 which is incident along the optic axis L2 to the spectral sensor 32 while gathering it. The spectral sensor 32 detects the intensity of the reflection light of the sample 5 which is incident thereon via the lens 31 for each wavelength thereof, i.e. for each substantially short wavelength. The obtained intensity for each wavelength is sent to the controller 4.

The beam splitter 33 is constructed by a half mirror disposed between the sample 5 and the lens 31 on the optic axis L2 and inclined 45° with respect to the optic axis L2, and is adapted to split the reflection light of the sample 5 by causing a part thereof to transmit therethrough while reflecting the remaining thereof. The lens 34 gathers the reflection light of the sample 5 split by the beam splitter 33 and guides it along the optic axis L2 to focus an image of the illumination light on the surface of the sample 5.

The position sensor 35 is constructed by an area sensor in which photoelectric conversion elements such as photodiodes are arrayed in matrix, and senses the reflection light of the sample 5 which is incident thereon via the lens 34. The intensity data of the respective photoelectric conversion elements are sent to the controller 4.

The controller 4 is constructed by a microcomputer or the like having built-in ROM 41 and RAM 42, and is adapted to control the operation of the spectral calorimeter such as the emission of the light source 21 and to calculate a spectral reflectance $R(\lambda)$ based on the intensity data for the respective wavelengths $\lambda$ obtained by the spectral sensor 32.

The controller 4 detects the center of the focus position of the illumination light of the sample 5 on a light sensing surface of the position sensor 35, i.e. the photoelectric conversion element having a maximum intensity based on the intensity data for the respective photoelectric conversion elements of the position sensor 35, and calculates a displacement from the focus position when the surface of the sample 5 is in its reference position in the case that this detected focus position is displaced.

Further, the controller 4 corrects the obtained spectral reflectance $R(\lambda)$ in accordance with the respective operation expressions in a procedure to be described later.

The RAM 42 temporarily stores data, and the ROM 41 stores a control program, preset data, operation expressions, etc. If $\theta_1$, $\theta_2$ and $L_0$ denote an angle between a normal line N to the sample 5 and the optic axis L1 (first angle), an angle between the normal line N and the optic axis L2 (second angle, $\theta_1 > \theta_2$ in this embodiment), and a reference distance between an intersection of the optic axis L1 and the sample 5 and the lens 23 when the surface of the sample 5 is in its reference position, the ROM 41 stores these angles $\theta_1$, $\theta_2$ and the reference distance $L_0$. Further, if $\alpha$ denotes the magnification of the image on the light sensing surface of the position sensor 35 to the image on the surface of the sample 5, the ROM 41 stores this magnification $\alpha$.

Figure 2:
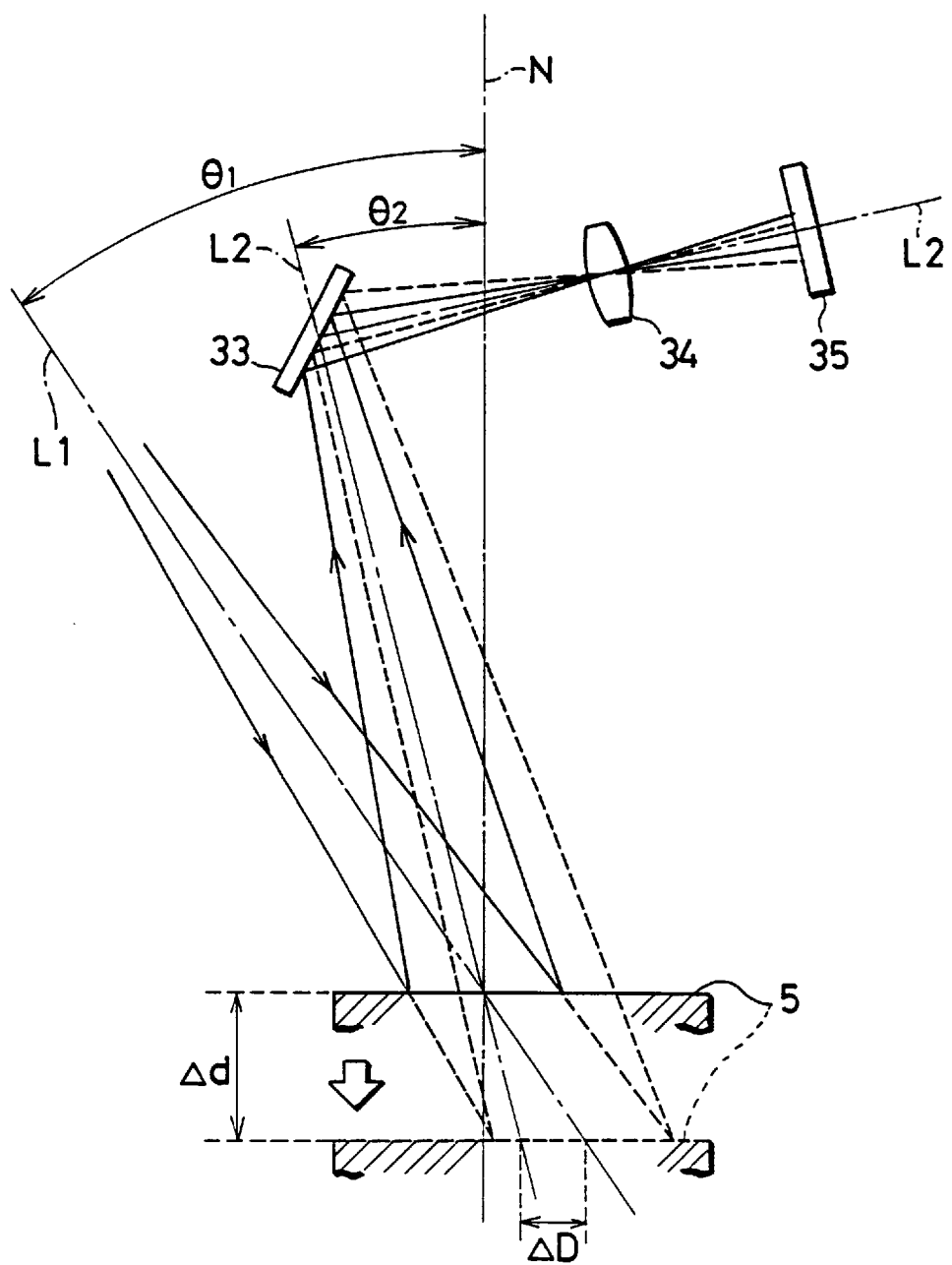
FIG. 2 is a diagram showing a position variation of an illumination light on a sample caused by a distance variation between the spectral calorimeter and the sample.
Figure 3:
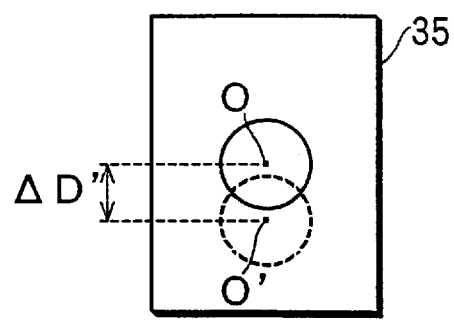
FIG. 3 is a diagram showing a focusing position of a varying illumination light on a light sensing surface of a position sensor in the state of FIG. 2.
Figure 4:
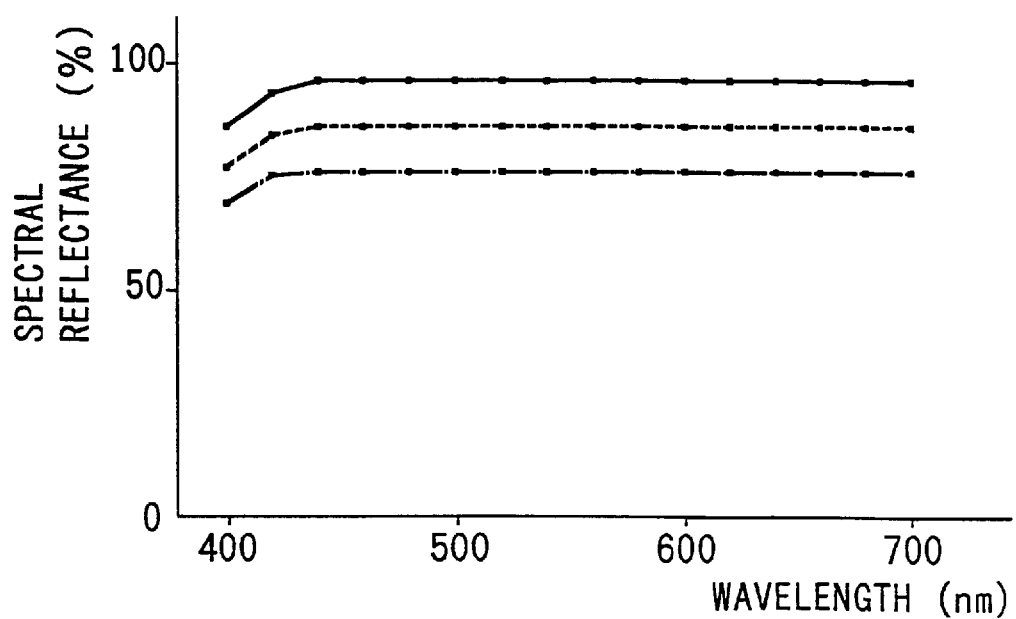
FIG. 4 is a graph showing a spectral reflectance when the surface of the sample is displaced from a reference position.

Next, with reference to FIGS. 2 to 4, the correction of the spectral reflectance data performed by the controller 4 is described. FIG. 2 is a diagram showing the position variation of the illumination light on the sample 5 caused by the distance variation between the spectral calorimeter and the sample 5. FIG. 3 is a diagram showing the focus position of the varying illumination light on the light sensing surface of the position sensor 35 in the state of FIG. 2. FIG. 4 is a graph showing a spectral reflectance when the surface of the sample 5 is displaced from its reference position, wherein a solid line curve represents a case where the surface of the sample 5 is located in its reference position, a broken line curve represents a case where the surface of the sample 5 is distanced from the reference position by distance $\Delta d_1$, and a phantom line curve represents a case where the surface of the sample 5 is displaced from the reference position by distance $\Delta d_2$ (where $\Delta d_1 < \Delta d_2$).

It should be noted that a direction the surface of the sample 5 is moved away from the reference position is a positive direction and a displacement displace is $\Delta d$ in FIG. 2.

A displacement distance $\Delta D$ of the position of the image formed by the illumination light on the surface of the sample 5 is defined as in following Equation (1) since $\theta_1 > \theta_2$:

$$\Delta D = \Delta d(\tan \theta_1 - \tan \theta_2) \quad (1)$$

On the other hand, a displacement distance of the position of the image on the light sensing surface of the position sensor 35 shown in FIG. 3, i.e. a distance $\Delta D'$ between a center position O of the illumination light image when the surface of the sample 5 is in its reference position and a center position O' of the illumination light image when the surface of the sample 5 is in its displaced position is defined as in Equation (2), using the magnification $\alpha$:

$$\Delta D' = \alpha \Delta D \quad (2)$$

If $\Delta D$ is eliminated from Equations (1) and (2), Equation (3) is obtained:

$$\Delta d = \Delta D' / \{\alpha(\tan \theta_1 - \tan \theta_2)\} \quad (3)$$

Accordingly, the controller 4 can obtain the displacement distance $\Delta d$ of the surface of the sample 5 from its reference position by detecting the displacement distance $\Delta D'$ of the focus position of the illumination light on the light sensing surface of the position sensor 35 from the reference position and performing the calculation of Equation (3).

Further, as shown in FIG. 2, when the surface of the sample 5 is distanced from its reference position by distance $\Delta d$, distance L between the intersection of the optic axis L1 and the sample 5 and the lens 23 is defined as in Equation (4):

$$L = L_0 + \Delta d / \cos \theta_1 \quad (4)$$

When the distance L is sufficiently long as compared with the diameter of the lens 23, the lens 23 can be considered to be a point light source. Since the illuminance on the surface of an object is in inverse proportion to a square of the distance, illuminance E on the surface of the sample 5 is, by Equation (4), substantially in proportion to:

$$\{L_0/L_0 + \Delta d/\cos \theta_1)\}^2 \quad (5)$$

On the other hand, when the surface of the sample 5 is distanced from the reference position in succession by distances $\Delta d_1$, $\Delta d_2$, the spectral reflectance falls in proportion to the illuminance E as shown in FIG. 4. If $R(\lambda)$ denotes a measurement value of the spectral reflectance obtained when the surface of the sample 5 is displaced from the reference position by distance $\Delta d$, a correction value $R_0(\lambda)$ which is equal to the spectral reflectance when the surface of the sample 5 is in its reference position can be obtained by Equation (6):

$$R_0(\lambda) = R(\lambda) \cdot \{(L_0 + \Delta d/\cos \theta_1)/L_0\}^2 \quad (6)$$

Next, the operation procedure of this spectral colorimeter is described with reference to a flowchart of FIG. 5. First, when the light source 21 emits light (Step #100), the emitted light is diffused in the integrating sphere 22; the diffused light coming out of the aperture 24 is gathered by the lens 23 and guided along the optic axis L1 to illuminate the surface of the sample in the form of a spot. Subsequently, the light components of the light reflected by the surface of the sample 5 and propagating along the optic axis L2 are split by the beam splitter 33.

The light having transmitted through the beam splitter 33 is gathered by the lens 31, incident on and sensed by the spectral sensor 32. A light reception data is fed to the controller 4. Subsequently, the spectral reflectance $R(\lambda)$ is calculated and stored in the RAM 42 (Step #110).

On the other hand, the light reflected by the beam splitter 33 is gathered by the lens 34; a spot image of the illumination light is formed on the position sensor 35; and the focus position of the illumination light is detected. Subsequently, the displacement distance ΔD' of the focus position of the illumination light from the reference position is calculated based on the detected position (Step #120). Then, the displacement distance Δd is calculated by substituting ΔD' into Equation (3) (Step #130).

Subsequently, correction calculation is performed by substituting the obtained displacement distance Δd and spectral reflectance R(λ) into Equation (6) to calculate the corrected spectral reflectance $R_0(\lambda)$ (Step #140).

In this way, the displacement distance Δd of the sample 5 is calculated based on the displacement distance ΔD' of the focus position of the illumination light on the light sensing surface of the position sensor 35, and the measured spectral reflectance R(λ) is corrected using the calculated displacement distance Δd. Accordingly, even if the distance between the spectral colorimeter and the surface of the sample 5 varies due to a variation in the thickness of the sample 5 and/or due to the warping of the sample 5, the spectral reflectance of the sample 5 can accurately be obtained.

In the foregoing embodiment, instead of the calculation of Equations (3) and (4), distances L of the sample with respect to a variety of detected displacement distances ΔD' may be calculated using Equations (3) and (4) or empirically calculated, and may be stored in the ROM 41 in the form of a table data. In such a case, the controller 4 can obtain a distance L of the sample 5 merely by extracting a value corresponding to a detected displacement distance ΔD' from the ROM 41. The measurement can be conducted at a higher speed by eliminating the above calculation.

Further, in the foregoing embodiment, instead of the calculation of Equation (6), the correction values $R_0(\lambda)$ of the spectral reflectance may be calculated based on a variety of detected displacement distances ΔD' and the spectral reflectance R(λ) using Equation (6), and may be stored in the ROM 41 in the form of a table data. Further, the correction values $R_0(\lambda)$ of the spectral reflectance may empirically be calculated based on a variety of detected displacement distances ΔD', and may be stored in the ROM 41 in the form of a table data. In such cases, the controller 4 can obtain the accurate spectral reflectance of the sample 5 only by extracting the correction value $R_0(\lambda)$ corresponding to a detected displacement distance ΔD' from the ROM 41. The measurement can be conducted at a higher speed by eliminating the above calculation.

Further, in the foregoing embodiment, a spectral distribution of the light source 21 may be stored in advance in the ROM 41 or a spectral sensor for detecting the spectral distribution of the light source may be provided, and spectral tristimulus values may be stored in the ROM 41. The controller 4 may calculate tristimulus values of the body color of the sample 5 based on the spectral distribution of the light source 21, the correction value $R_0(\lambda)$ of the spectral reflectance of the sample 5 and the spectral tristimulus values.

The shape of the illumination light on the surface of the sample 5 may be a slit-like rectangular shape or any shape suitable for the detection of the displacement distance.

Further, the spectral sensor 32 may be constructed by an area sensor in which photoelectric conversion elements are arrayed in matrix, and a displacement distance of the illumination light from the reference position may be obtained on the light sensing surface of the spectral sensor 32. In this case, since the beam splitter 33, the lens 34 and the position sensor 35 can be dispensed with, the measurement apparatus can be made smaller by reducing the number of parts.

Furthermore, the position sensor 35 may be an elongated line sensor extending along a plane defined by the optic axes L1, L2. Even in this case, since the position of the illumination light is displaced along this plane, the displacement distance can be detected. The position sensor 35 may also be a spot detecting device including silicone photodiodes.

In the foregoing embodiment, measurement of reflection characteristic of samples is described. However, the present invention may be applicable for an optical characteristic measuring apparatus for measuring transmittance characteristic of samples.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An optical characteristic measuring apparatus comprising:

an illuminator which projects a beam of illuminating light to a sample along a first optic axis;

a light receiver which receives light reflected from the sample to generate light reception data, the light receiver including an optical system having a second optic axis intersecting the first optic axis;

an optical characteristic calculator which calculates an optical characteristic of the sample based on the light reception data;

a position detector which detects a position of an illuminated portion of the sample; and a corrector which corrects a calculated optical characteristic based on a detected position of the illuminated portion.

2. An optical characteristic measuring apparatus as defined in claim 1, which measures a spectral reflection characteristic of the sample.

3. An optical characteristic measuring apparatus as defined in claim 1, which measures a spectral transmittance characteristic of the sample.

4. An optical characteristic measuring apparatus as defined in claim 1, wherein said position detector optically detects a position of an illuminated portion of the sample.

5. An optical characteristic measuring apparatus comprising:

an illuminator which projects a beam of illuminating light to a sample along a first optic axis;

a light receiver which receives light reflected from the sample to generate light reception data, the light receiver including an optical system having a second optic axis intersecting the first optic axis;

an optical characteristic calculator which calculates an optical characteristic of the sample based on the light reception data;

a position detector which detects a position of an illuminated portion of the sample; and a corrector which corrects a calculated optical characteristic based on a detected position of the illuminated portion, wherein the position detector is on the second optical axis.

6. An optical characteristic measuring apparatus as defined in claim 5, wherein the position detector detects a positional displacement of an illuminated portion.

7. An optical characteristic measuring apparatus as defined in claim 6, wherein the corrector includes:

a memory which stores:

a first angle between a normal line to the sample and the first optic axis, a second angle between the normal line and the second optic axis, and a reference distance between the illuminator and the sample when the sample is in a predetermined reference position;

a distance calculator which calculates:

a displacement distance of the sample with respect to the reference position based on the first angle, the second angle, and a detected positional displacement of an illuminated position, and a distance between the illuminator and the sample based on the first angle, the reference distance, and a calculated displacement distance of the sample; and a correction value calculator which calculates a correction value based on a calculated distance.

8. An optical characteristic measuring apparatus as defined in claim 6, wherein the corrector includes:

a memory which stores a relationship between a detected positional displacement of an illuminated portion and a distance between the illuminator and the sample; and a correction value calculator which calculates a correction value based on a obtained distance.

9. An optical characteristic measuring apparatus as defined in claim 6, wherein the corrector includes a memory which stores a relationship between a detected positional displacement of an illuminated portion and a correction value.

10. An optical characteristic measuring apparatus as defined in claim 5, wherein the light receiver includes a spectral sensor which receives light reflected from the sample, and the optical system includes a splitter which is provided on the second optic axis and splits light reflected from the sample in to the spectral sensor and the position detector.

11. An optical characteristic measuring apparatus as defined in claim 10, wherein the splitter includes a half mirror.

12. An optical characteristic measuring apparatus as defined in claim 5, wherein the light receiver includes a spectral sensor which receives light reflected from the sample, and the position detector includes a position sensor which receives light reflected from the sample, and the spectral sensor and the position sensor are integrally constructed into one body.

13. An optical characteristic measuring apparatus comprising:

an illuminator which projects a beam light illuminating a spot on a sample along a first optic axis;

a light receiver which receives light reflected from the sample to generate light reception data, the light receiver including an optical system having a second optic axis intersecting the first optic axis;

an optical characteristic calculator which calculates an optical characteristic of the sample based on the light reception data;

a position detector which determines a position of the illuminated spot on the sample based on the light reception data; and a corrector which corrects a calculated optical characteristic based on the detected position of the illuminated spot.

* * * * *